United States Patent
Pistoia et al.

(10) Patent No.: US 11,032,306 B2
(45) Date of Patent: Jun. 8, 2021

(54) SYSTEM, METHOD AND APPARATUS FOR FULLY PRECISE HYBRID SECURITY VERIFICATION OF MOBILE APPLICATIONS

(71) Applicant: International Business Machines Corporation, Armonk, NY (US)

(72) Inventors: Marco Pistoia, Amawalk, NY (US); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 14/984,782

(22) Filed: Dec. 30, 2015

(65) Prior Publication Data

US 2017/0195358 A1    Jul. 6, 2017

(51) Int. Cl.
*G06F 21/00* (2013.01)
*H04L 29/06* (2006.01)
*G06F 16/84* (2019.01)

(52) U.S. Cl.
CPC .......... *H04L 63/1433* (2013.01); *G06F 16/84* (2019.01)

(58) Field of Classification Search
CPC ................................................. H04L 63/1433
USPC ............................................ 713/156; 726/25
See application file for complete search history.

(56) References Cited

U.S. PATENT DOCUMENTS

| 7,143,441 | B2 | 11/2006 | Rygaard et al. |
| 7,979,368 | B2 | 7/2011 | Kapoor et al. |
| 8,397,301 | B2 | 3/2013 | Hering et al. |
| 8,516,449 | B2* | 8/2013 | Artzi ................... G06F 11/3604 717/124 |
| 2007/0169199 | A1* | 7/2007 | Quinnell ............... G06F 21/577 726/25 |
| 2009/0125976 | A1* | 5/2009 | Wassermann ............. G06F 8/00 726/1 |
| 2012/0304299 | A1 | 11/2012 | Kelekar |
| 2013/0055117 | A1* | 2/2013 | Sahibzada ................. G06F 8/38 715/762 |
| 2013/0091578 | A1* | 4/2013 | Bisht ....................... G06F 21/53 726/25 |
| 2013/0174262 | A1* | 7/2013 | Amit ..................... G06F 21/577 726/25 |
| 2015/0242636 | A1* | 8/2015 | Khan .................... G06F 21/577 726/25 |
| 2015/0288705 | A1* | 10/2015 | Ligman ............... H04L 63/1433 726/1 |
| 2017/0195358 | A1* | 7/2017 | Pistoia .................... G06F 16/84 |

* cited by examiner

*Primary Examiner* — Harris C Wang
(74) *Attorney, Agent, or Firm* — Joseph Petrokaitis, Esq.; McGinn IP Law Group, PLLC (57) ABSTRACT

A security verification system and method that includes outputting a list of potential dataflow vulnerabilities as a first output from inputting a subject program and security specification, mapping candidate vulnerabilities to a user interface (UI) entry point and payload from the output of the list of potential dataflow vulnerabilities to provide a second output, and performing directed testing of the second output.

20 Claims, 9 Drawing Sheets

SYSTEM, METHOD AND APPARATUS FOR FULLY PRECISE HYBRID SECURITY VERIFICATION OF MOBILE APPLICATIONS

BACKGROUND OF THE INVENTION

Field of the Invention

The disclosed invention relates generally to method and apparatus to for security verification, and more particularly, but not by way of limitation, relating to a method and apparatus for hybrid security verification of mobile and other applications.

Description of the Related Art

Mobile apps (software applications for mobile devices such as phones, tablet device, etc.) are gaining increasing prominence and attention. As such, they are becoming the target of more and more security attacks. These include malicious attempts to manipulate the internal, or persistent, state of the application by means of injecting malicious data inputs into the application, as well as causing the application to leak information. These two classes of vulnerabilities are classically known as injection and confidentiality vulnerabilities, respectively.

An injection attack can occur when input has not been validated. Injection attacks can provide a form of input and attach additional malicious data to perform some other or additional input or command. Injection attacks can use an input to do possibly malicious corruption of the program or data. For example, SQL Injection is a type of injection or attack in an application, in which the attacker provides structured query language (SQL) code to a user input box to obtain unauthorized and even unlimited access. The attacker's input is transmitted into an SQL query where it will form an SQL code.

Confidentiality refers to limiting access to information on a resource to authorized people. An attacker that exploits a weakness in an application to access unauthorized information is compromising the confidentiality of that application. For example, a weakness in a web site that enables a visitor to read a file that should not be read can be security vulnerability.

However, it is desirable to provide method and apparatus for security verification that can protect again security vulnerabilities of applications.

SUMMARY OF INVENTION

In view of the foregoing and other problems, disadvantages, and drawbacks of the aforementioned background art, an exemplary aspect of the disclosed invention provides a system and method of hybrid security verification.

One aspect of the disclosed invention provides a security verification method stored in a computer readable medium, including outputting a list of potential dataflow vulnerabilities as a first output from inputting a subject program and security specification, mapping candidate vulnerabilities to a user interface (UI) entry point and payload from the output of the list of potential dataflow vulnerabilities to provide a second output, and performing directed testing of the second output.

The subject program is a mobile application for use on a mobile device. The mapping further includes performing a string analysis on the first output. The mapping further includes traversing a control flow path defined by a reported dataflow vulnerability backwards and gathers constraints on a string flowing into a sink operation, a collected constraints being fed into a constraint solver, which either outputs a security payload that meets the constraints or declares failure. After success of the string analysis, then finding a user interface (UI) entry point through which a payload can be injected.

The method can further include using UI instrumentation to record a connected between rendered UI controls and their code bindings. The directed testing further comprises uses a dynamic testing tool that navigates back to an input point based on UI mapping information and then injects one or more payloads that match constraints computed in the outputting.

The method can further include displaying a vulnerability report from a result of performing directed testing with an option of a confidence associated with the report from dynamic analysis. The security verification method can be implemented in a cloud computing environment.

In another example aspect of the disclosed invention, there is a method of security verification in cloud computing environment, including outputting potential dataflow vulnerabilities as a first output from inputting a subject program and security specification, mapping candidate vulnerabilities to an interface entry point and payload from the output of potential dataflow vulnerabilities to provide a second output, and performing directed testing of the second output.

Yet another example aspect of the disclosed invention includes a system for security verification, including a memory, and a processor coupled to the memory, wherein: the processor outputs a list of potential dataflow vulnerabilities as a first output from inputting a subject program and security specification, the processor maps candidate vulnerabilities to a user interface (UI) entry point and payload from the output of the list of potential dataflow vulnerabilities to provide a second output, and the processor performs directed testing of the second output.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

Automated analysis algorithms have shown value in detecting mobile security problems. These typically apply taint analysis: a form of dataflow analysis that tracks flow of vulnerable information from sources (i.e. statements reading either user input (integrity) or secret data (confidentiality)) to sinks (i.e. statements that either perform security-sensitive operations (integrity) or release information to external observers (confidentiality)).

The main challenge with the standard technique of taint analysis is to mitigate the rate of false positives. An analysis tool may conclude that there is security vulnerability, due to source-to-sink flow of information, where in fact the flow is benign. As a simple example, consider the threat of leaking the unique hardware identifier of a mobile device (IMEI).

The International Mobile Station Equipment Identity (IMEI) is a number, usually unique, that identifies 3GPP (3rd Generation Partnership Project), 4G Mobile Broadband Evolution (3GPP, release 10 and beyond) and iDEN mobile phones as well as certain satellite phones. The IMEI consists of 16 digits. The Type Allocation Code (TAC) is the first 8 digits. The TAC provides the model and origin of the device. The next 6 digits are a manufacturer-defined number or serial number known as SNR. Finally, the last digit is a Luhn check digit. Therefore, if only the last digit leaks, then there is no release of secret information.

The standard approach to detection of such a problem would be to track whether a value deriving from the IMEI flows into a security sink.

Consider, however, the following code fragment, which reads a portion of the IMEI and publishes it to a log file:
String imei=getIMEI( ); // Source
String check=imei.substring(14); // Only check digit
log.write(check); // Sink In the above code, it checks only stores of the last two bits of the IMEI, and is thus a benign value, conveying information that is hardly useful to an attacker. Taint analysis, however, would falsely report vulnerability on the flow above for its inability to realize that the dataflow it supports is actually benign.

As for the alternative of performing dynamic dataflow analysis, on the fly, the obvious problem is soundness. The analysis may miss vulnerabilities due to its inability, in general, to explore all execution paths. This leaves only two viable alternatives. Either the developer has to go through a long list of security reports and classify them into true and false positives, or the runtime system can apply only security checking, which significantly degrades performance and usability.

Figure 1:
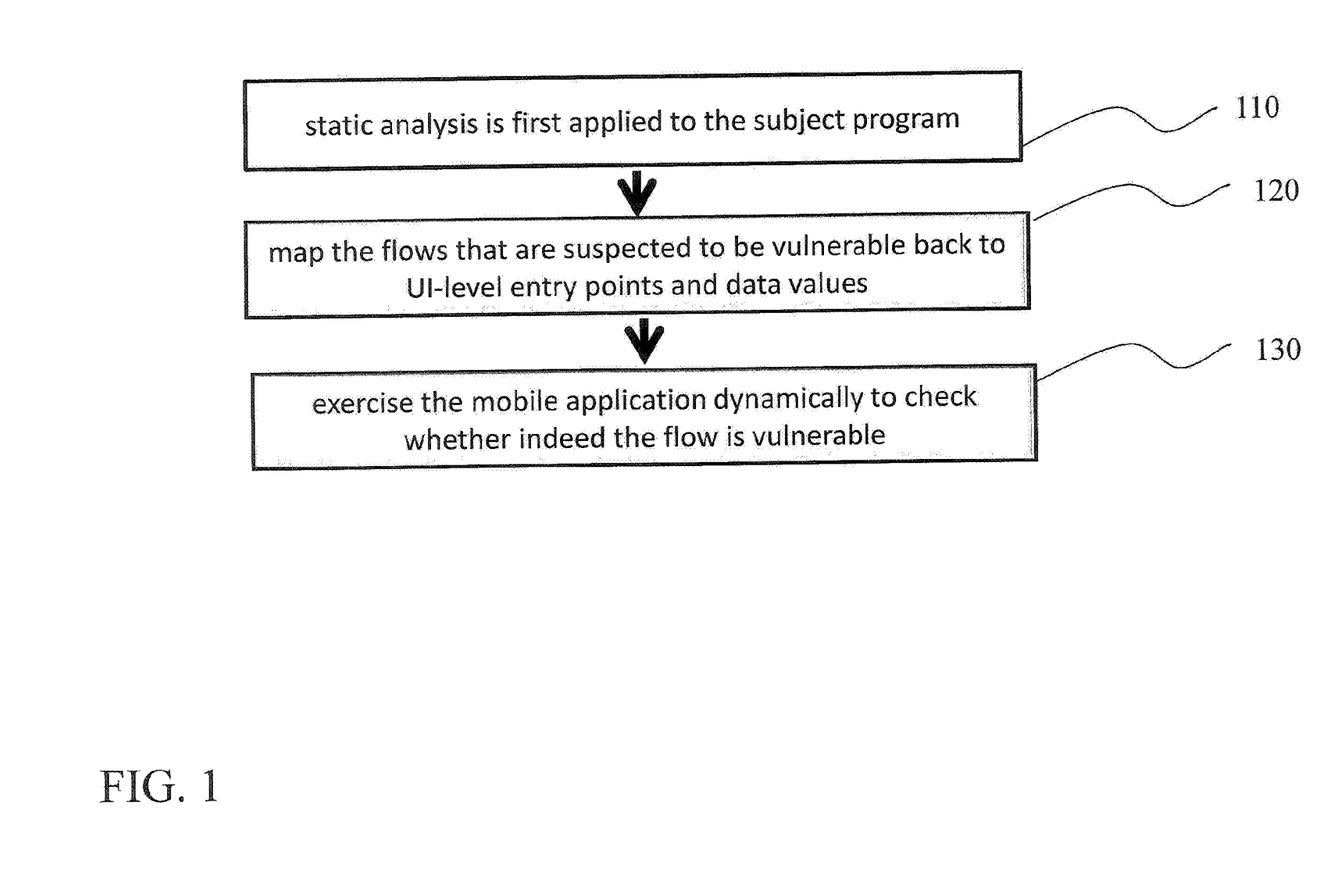
FIG. 1 shows example method steps of hybrid security verification of the disclosed invention.

The example embodiments propose a revolutionary approach to the problem of mobile security testing. Referring to FIG. 1, in the example approach of the disclosed invention, a static analysis is first applied to the subject program to uncover candidate vulnerabilities (step 110). The next step is to map the flows that are suspected to be vulnerable back to UI-level entry points and data values (step 120). The third and final step is to exercise the mobile application dynamically to check whether indeed the flow is vulnerable (step 130).

All these steps in FIG. 1 can be performed automatically. Moreover, additional steps or a different order can be made from the example shown. In terms of user experience, automation provides enormous value. First, the analysis tool performs verification, rather than testing, in that it guarantees full coverage. Second, the tedious, burdensome and error-prone task of analyzing the reported vulnerabilities and validating their correctness is completely obviated, and in the most precise way possible. The dynamic analysis either confirms or refutes the presence of a vulnerability by directly testing for it.

Figure 2:
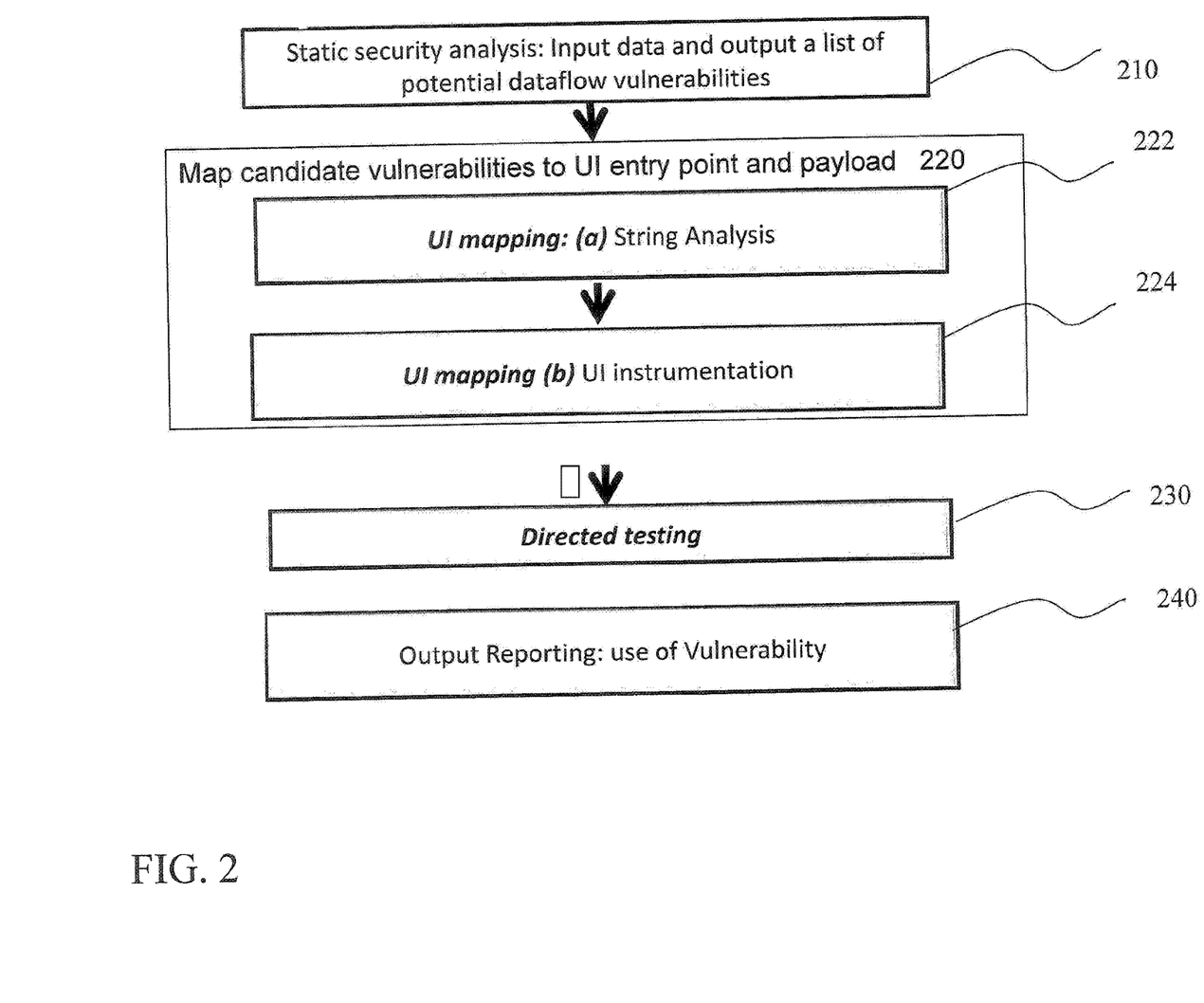
FIG. 2 shows another example of hybrid security verification of the disclosed invention.

Further detail of an example approach in detail is provided as follows as referred to FIG. 2.

Static Security Analysis.

The first step (210) of the example approach is realizable using existing tools and techniques, such as static taint analysis (as discussed above). The input is the subject program, along with a security specification, and the output is a list of potential dataflow vulnerabilities, where each vulnerability is reported as a sequence of milestones within the application's code.

UI Mapping.

The next step (220) in the process is to map candidate vulnerabilities to an appropriate UI entry point and payload. To tackle these challenges, that are two example respective techniques in sub-steps 222 and 224:

UI Mapping: (a) String Analysis.

To converge on an effective payload for testing whether the reported security defect is real, it is proposed the use of string analysis (SA) technologies (Step 222), such as [SAMSO]. String analysis is a static analysis technique that determines the string values that a variable can hold at specific points in a program. The information in the string analysis is often useful to help program understanding, to detect and correct security vulnerabilities.

The SA algorithm traverses the control flow path defined by the reported dataflow vulnerability backwards and gathers constraints on the string flowing into the sink operation [SNUGGLEBUG]. The collected constraints are fed into a constraint solver, which either outputs a security payload that meets the constraints or declares failure.

UI Mapping: (b) UI Instrumentation.

Assuming the previous step (step 222) succeeded, the next objective is to find a UI (user interface) entry point through which the payload can be injected. For this, one utilizes the fact that mobile applications are normally small, containing only few views and controls, and are thus amenable to manual crawling. Thus, assuming the user is able to perform lightweight crawling of the application, it is proposed to use a UI instrumentation (Step 224) framework—e.g. [SELENIUM]—to record the connection between rendered UI controls and their code bindings.

Directed Testing

The third and final step (230) is to perform directed testing per the information obtained in the previous step (UI mapping: step 220) of which payload to inject and where to inject it. The dynamic testing tool navigates back to the input point (based on UI mapping information), and then injects one or more payloads that match the constraints computed during the first step 210. Validation can be performed either in a black-box fashion or using glass-box capabilities or by combining between the two approaches.

Output: Reports

Additionally, there is a question of how to present vulnerability reports (Step 240) under the present disclosed hybrid analysis setting to the user. One option is to let the dynamic analysis control only the confidence associated with a report. If the vulnerability has been confirmed as real using the dynamic analysis, then it is given 100% confidence. Another option is to completely eliminate a vulnerability that appears spurious according to the dynamic analysis. There is more than one alternative here, and this part of the algorithm can be unspecified. Additionally, for example, reports can be displayed on a display device or outputted to other peripherals.

Figure 3:
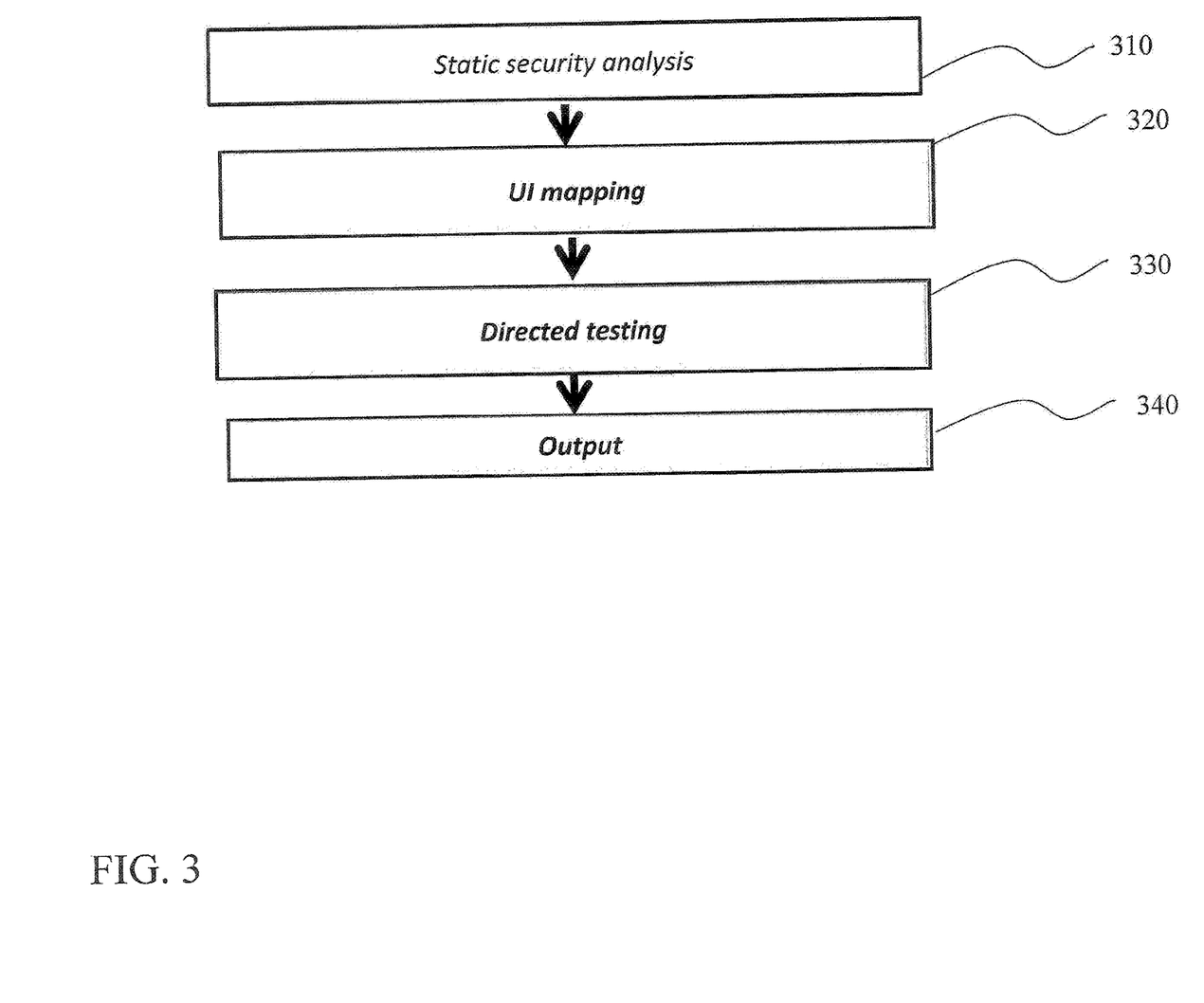
FIG. 3 shows yet another example of hybrid security verification of the disclosed invention.

Referring to FIG. 3, another example is provided.

Static Security

The first step (310) of another example approach is realizable using a static security analysis technique where, for example, the input is the subject program, along with a security specification, and the output is a list of potential dataflow vulnerabilities, where each vulnerability is reported as a sequence of milestones within the application's code or other variation of these variables.

UI Mapping.

The next step (320) in the process is to map candidate vulnerabilities to an appropriate UI entry point and payload. To converge on an effective payload for testing whether the reported security defect is real, a static analysis technique can be used. Moreover, the UI mapping includes finding a UI (user interface) entry point through which the payload can be injected. For this, one can utilize the fact that mobile applications are normally small, containing only few views and controls, and are thus amenable to manual crawling. Thus, assuming the user is able to perform lightweight crawling of the application, it is proposed to use a UI instrumentation framework.

Directed Testing

The third step (330) is to perform directed testing per the information obtained in the previous step (320) of which payload to inject and where to inject it. The dynamic testing tool navigates back to the input point (based on UI mapping information), and then injects one or more payloads that match the constraints computed during the first step 310. Validation can be performed either in a black-box fashion or using glass-box capabilities or by combining between the two approaches.

Output: Reports

Additionally, there is an output of the results as a report (Step 340). The user may have one option to let the dynamic analysis control only the confidence associated with a report. Another option is to completely eliminate a vulnerability that appears spurious according to the dynamic analysis. Since there are many possibilities, the vulnerability reporting can be left as unspecified.

Figure 4:
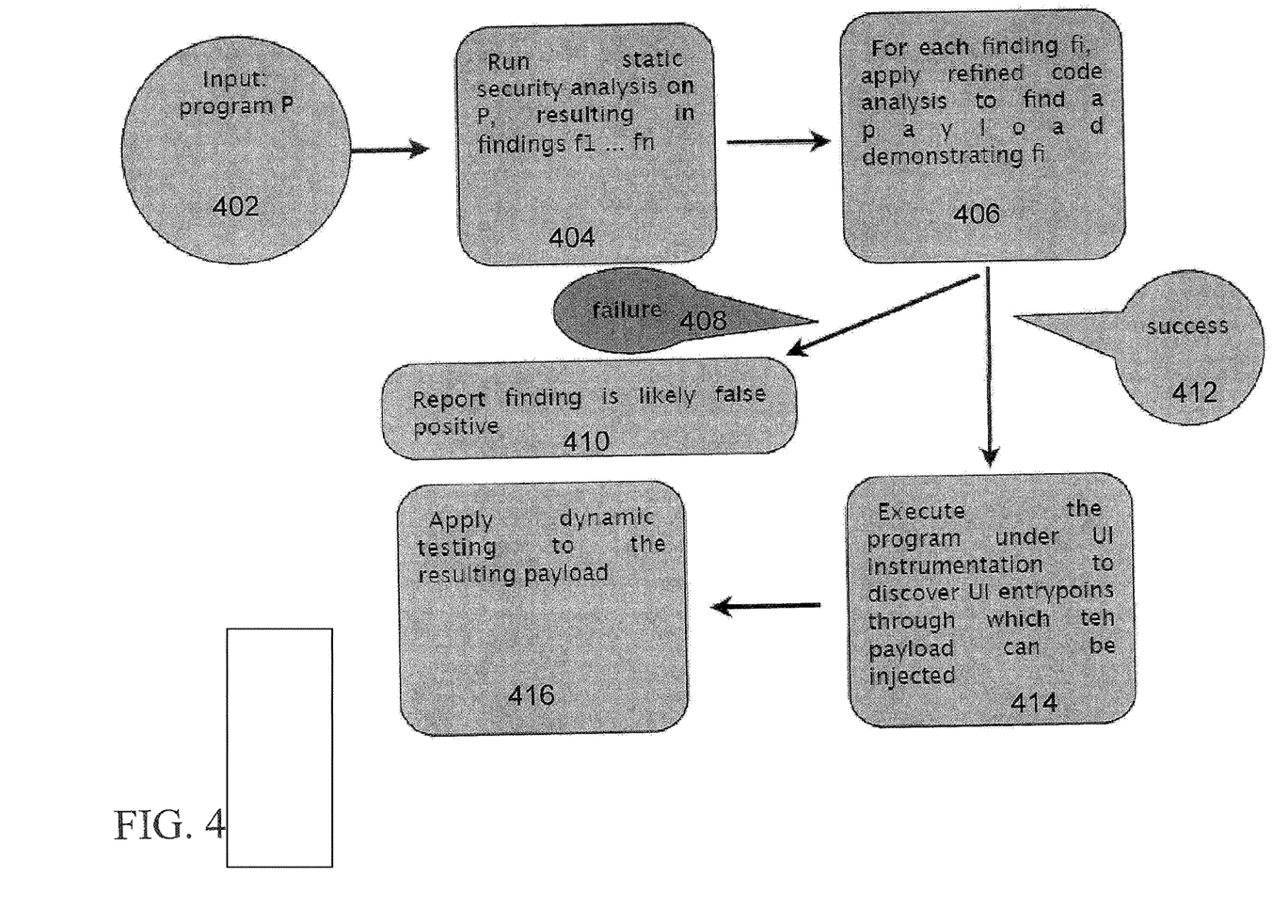
FIG. 4 shows another example of hybrid security verification of the disclosed invention.

FIG. 4 shows another example of the hybrid security verification of the disclosed invention. First, the program "P" is inputted in step 402. Then, the system runs a static security analysis on the program "P", resulting in findings f1 . . . fn (where n is an integer) in step 404. Then, for each finding "fi" (a finding from f1 . . . fn), the system applies the refined code analysis to find a payload demonstrating the finding "fi" (a finding from f1 . . . fn) in step 406. Then, if there is failure 408 in step 406, there is report of that the finding is likely a false positive 410. Otherwise, if there is a success 412 in step 406, then the system executes the program under UI instrumentation to discover UI entry points through which the payload can be injected 414. Thereafter, the system applies dynamic testing to the resulting payload 416. Other variations are also possible.

Exemplary Hardware and Cloud Implementation

Figure 5:
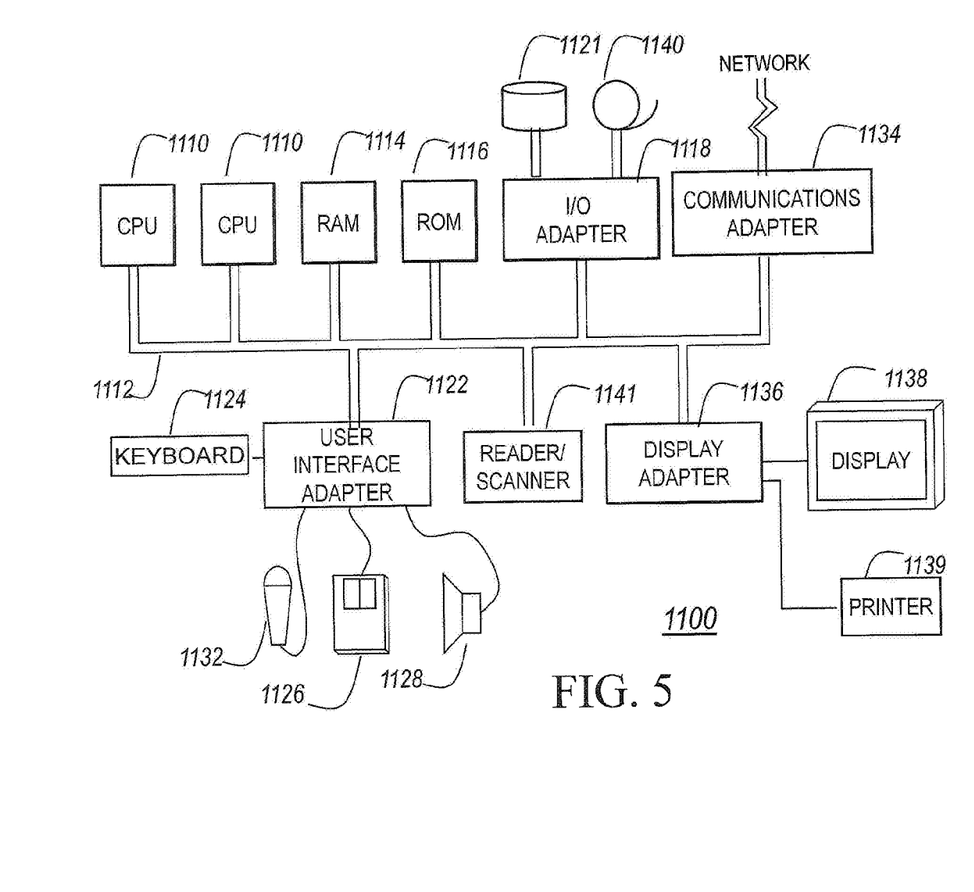
FIG. 5 illustrates an exemplary hardware/information handling system for incorporating the exemplary embodiment of the invention therein.

FIG. 5 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 6), directly or indirectly accessible by the CPU 1210.

Figure 6:
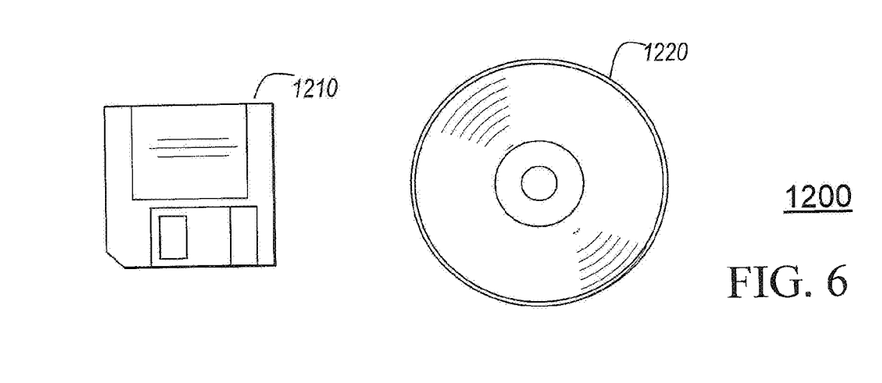
FIG. 6 illustrates a signal-bearing storage medium for storing machine-readable instructions of a program that implements the method according to the exemplary embodiment of the invention.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
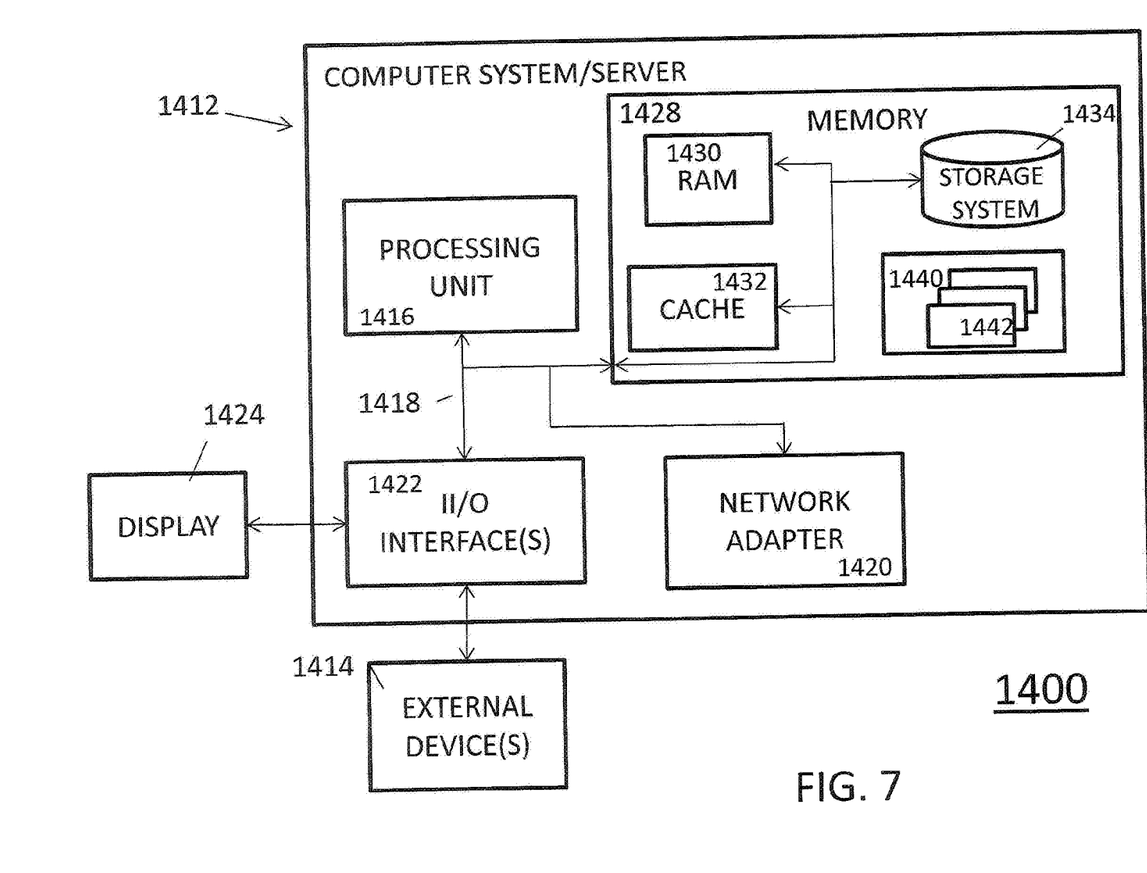
FIG. 7 depicts a cloud computing node according to an embodiment of the present invention.

Referring now to FIG. 7, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 8:
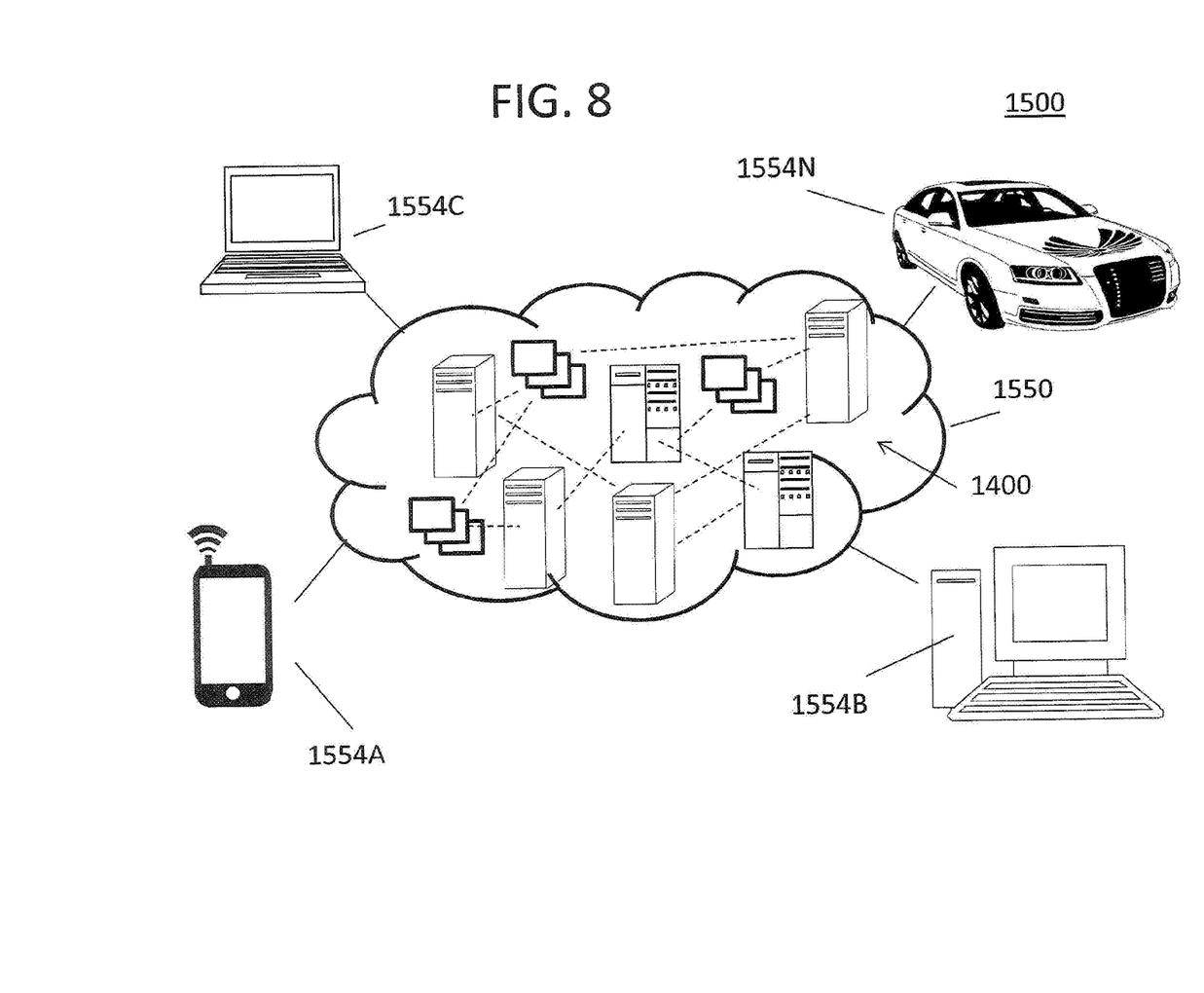
FIG. 8 depicts a cloud computing environment according to an embodiment of the present invention.

Referring now to FIG. 8, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 8 are intended to be illustrative only and that computing nodes 1400 and cloud computing environment 1550 can communicate with any type of computerized device over any type of network and/or network addressable connection (e.g., using a web browser).

Figure 9:
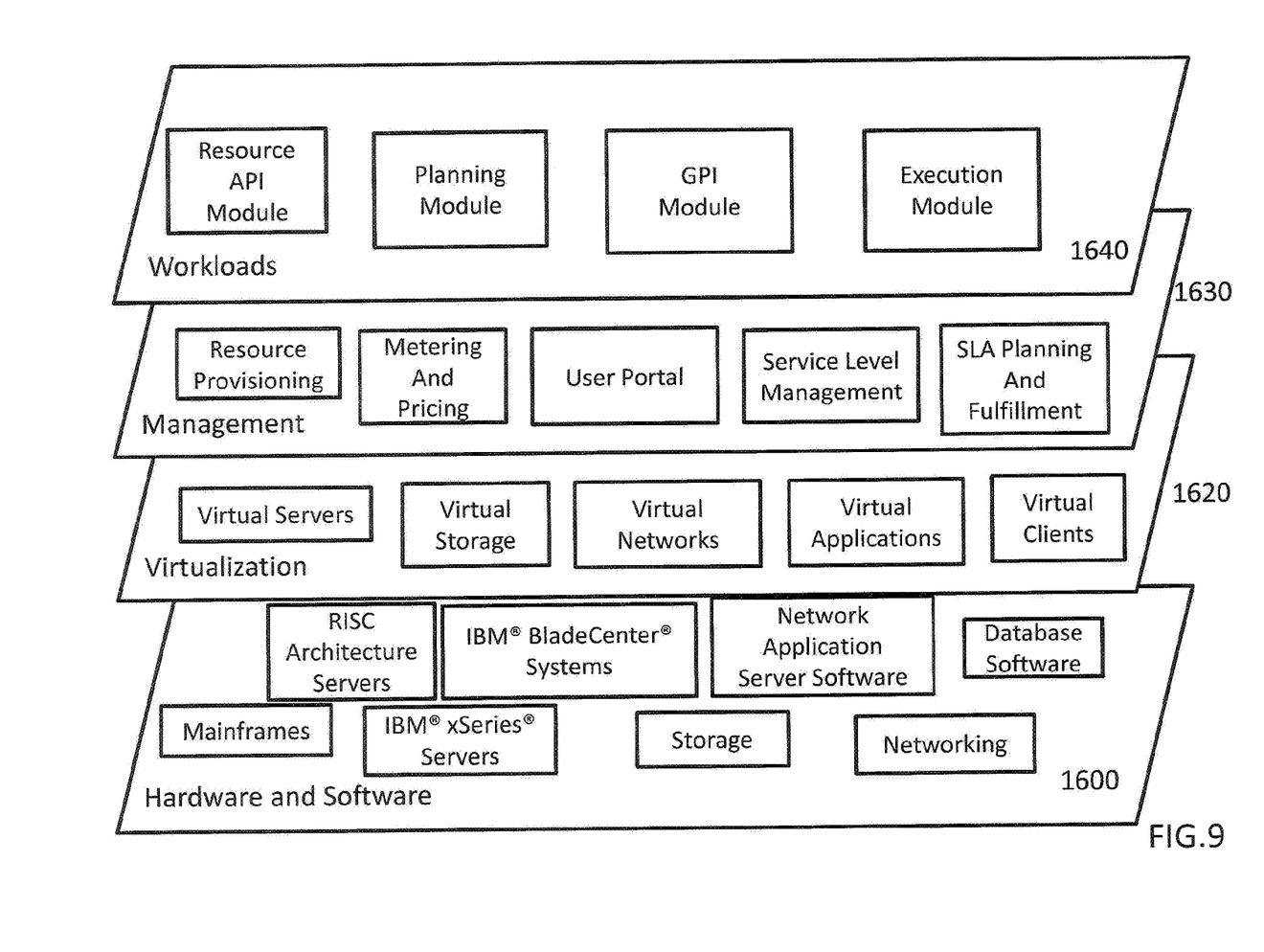
FIG. 9 depicts abstraction model layers according to an embodiment of the present invention.

Referring now to FIG. 9, a set of functional abstraction layers provided by cloud computing environment 1550 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the disclosed invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A security verification method stored in a computer readable medium, comprising:
applying a static analysis to a subject program to uncover potential dataflow vulnerabilities;
outputting a list of the potential dataflow vulnerabilities as a first output from inputting the subject program and security specification for the static analysis;
mapping candidate vulnerabilities via string analysis and user interface instrumentation to a user interface (UI) entry point and payload from the output of the list of potential dataflow vulnerabilities to provide a second output via UI-level and code-level events; and
performing directed dynamic testing of the subject program according to the second output and in accordance with constraints computed during the static analysis to confirm or refute a presence of a vulnerability,
wherein the mapping further comprises traversing a control flow path defined by a reported dataflow vulnerability backwards and gathers constraints on a string flowing into a sink operation.

2. The security verification method according to claim 1, wherein the subject program is a mobile application for use on a mobile device,
wherein the mapping further comprises:
converging on the effective payload for the directed testing of whether a reported security defect is real, and determining string values that a variable can hold at specific points in the subject program by the string analysis, and
finding the UI (user interface) entry point through which the payload can be injected by the user interface (UI) instrumentation after the string analysis.

3. The security verification method according to claim 1, wherein the mapping further comprises performing a string analysis on the first output to converge on an effective payload for performing the directed testing of whether a reported security defect is real,
wherein the mapping includes mapping flows that are suspected to be vulnerable back to UI-level entry points and data values, and
wherein the directed dynamic testing navigates back to the input point based on UI mapping information, and then injects one or more payloads that match constraints computed during the static analysis.

4. The security verification method according to claim 1, wherein the mapping further comprises traversing the control flow path defined by the reported dataflow vulnerability backwards and gathers constraints on the string flowing into a sink operation, a collected set of constraints being fed into a constraint solver, which either outputs a security payload that meets the constraints or declares failure.

5. The security verification method according to claim 3, wherein after success of the string analysis, then finding a user interface (UI) entry point through which a payload can be injected.

6. The security verification method according to claim 5, further comprising of using UI instrumentation to record a connected between rendered UI controls and their code bindings.

7. The security verification method according to claim 1, wherein the directed testing further comprises uses a dynamic testing tool that navigates back to an input point based on UI mapping information and then injects one or more payloads that match constraints computed in the outputting,
wherein the mapping includes converging on an effective payload and finding the user interface entry point, and
wherein the performing of the directed testing of the subject program includes using the effective payload and the user interface entry point.

8. The security verification method according to claim 1, further comprising of displaying a vulnerability report from a result of performing directed testing with an option of a confidence associated with the report from dynamic analysis.

9. The security verification method according to claim 1, wherein the directed testing further comprises uses a dynamic testing tool that navigates back to an input point based on UI mapping information to determine vulnerabilities, and
wherein the performing of directed dynamic testing of the subject program includes using the second output of which payload to inject and where to inject the payload.

10. A method of security verification in a cloud computing environment, comprising:
applying a static analysis to a subject program to uncover potential dataflow vulnerabilities;
outputting the potential dataflow vulnerabilities as a first output from inputting the subject program and security specification for the static analysis;
mapping candidate vulnerabilities via string analysis and user interface instrumentation to an interface entry point and payload from the output of potential dataflow vulnerabilities to provide a second output via UI-level and code-level events; and
performing directed dynamic testing of the subject program according to the second output and in accordance with constraints computed during the static analysis to confirm or refute a presence of a vulnerability,
wherein the mapping further comprises traversing a control flow path defined by a reported dataflow vulnerability backwards and gathers constraints on a string flow into a sink operation.

11. The method according to claim 10, wherein the subject program is a mobile application for use on a mobile device,
wherein the mapping candidate vulnerabilities further comprises:
converging on the effective payload for the directed testing of whether a reported security defect is real, and determining string values that a variable can hold at specific points in the subject program by the string analysis, and
finding the UI (user interface) entry point through which the payload can be injected by the user interface (UI) instrumentation after the string analysis is successful.

12. The method according to claim 10, wherein the mapping further comprises performing a string analysis on the first output.

13. The method according to claim 10, wherein the mapping further comprises traversing the control flow path defined by the reported dataflow vulnerability backwards and gathers constraints on the string flowing into the sink operation, a collected set of constraints being fed into a constraint solver, which either outputs a security payload that meets the constraints or declares failure.

14. The method according to claim 12, wherein after success of the string analysis, then finding the interface entry point through which a payload can be injected.

15. The method according to claim 14, further comprising of using an interface instrumentation to record a connected between rendered interface controls and their code bindings.

16. The method according to claim 10, wherein the directed testing further comprises uses a dynamic testing tool that navigates back to an input point based on UI mapping information and then injects one or more payloads that match constraints computed in the outputting.

17. A system for security verification, comprising:
a memory; and
a processor coupled to the memory, wherein:
the processor applies a static analysis to a subject program to uncover potential dataflow vulnerabilities;
the processor outputs a list of the potential dataflow vulnerabilities as a first output from inputting the subject program and security specification for the static analysis,
the processor maps candidate vulnerabilities via string analysis and user interface instrumentation to a user interface (UI) entry point and payload from the output of the list of potential dataflow vulnerabilities to provide a second output via UI-level and code-level events, and
the processor performs directed dynamic testing of the subject program according to the second output and in accordance with constraints computed during the static analysis to confirm or refute a presence of a vulnerability,
wherein the processor mapping further comprises the processor traversing a control flow path defined by a reported dataflow vulnerability backwards and gathering constraints on a string flowing into a sink operation.

18. The system according to claim 17, wherein the subject program is a mobile application for use on a mobile device, and
wherein the processor maps candidate vulnerabilities by:
converging on the effective payload for the directed testing of whether a reported security defect is real, and determining string values that a variable can hold at specific points in the subject program by the string analysis, and
finding the UI (user interface) entry point through which the payload can be injected by the user interface (UI) instrumentation after the string analysis is successful.

19. The system according to claim 17, wherein the processor mapping further comprises the processor performs a string analysis on the first output.

20. The system according to claim 17, wherein the processor mapping further comprises the processor traversing the control flow path defined by the reported dataflow vulnerability backwards and gathering constraints on the string flowing into the sink operation, a collected set of constraints being fed into a constraint solver, which either outputs a security payload that meets the constraints or declares failure.

* * * * *